United States Patent [19]

Escoffier

[11] 3,781,692

[45] Dec. 25, 1973

[54] SWITCHING CIRCUIT APPARATUS

[75] Inventor: Raymond P. Escoffier, Charlottesville, Va.

[73] Assignee: Collins Radio Company, Dallas, Tex.

[22] Filed: Apr. 30, 1973

[21] Appl. No.: 355,603

[52] U.S. Cl. ............ 328/138, 307/233, 307/235 R, 328/132, 328/139, 328/140

[51] Int. Cl. ............ H03k 5/153

[58] Field of Search ............ 307/233, 235; 328/116, 117, 127, 132, 136, 138, 139, 140, 141

[56] References Cited

UNITED STATES PATENTS

| | | | |
|---|---|---|---|
| 3,584,310 | 6/1971 | Hochfelder | 328/117 X |
| 3,638,183 | 1/1972 | Prögler et al. | 307/235 R X |
| 3,437,941 | 4/1969 | Leary | 307/233 X |
| 3,548,206 | 12/1970 | Ogle et al. | 328/116 X |
| 3,571,522 | 3/1971 | Cox | 328/138 X |
| 3,652,805 | 3/1972 | Wisner | 328/138 X |

OTHER PUBLICATIONS

Fromer, "Power Amplifier Circuit," IBM Tech. Discl. Bull., Vol. 13, No. 4, p. 949; 9/1970

Cackowski et al., "Pulse Detector," IBM Tech. Discl. Bull., Vol. 7, No. 5, pp. 344–345, 10/1964.

*Primary Examiner*—John S. Heyman
*Assistant Examiner*—L. N. Anagnos
*Attorney*—Bruce C. Lutz

[57] ABSTRACT

A circuit for detecting a burst of single frequency waveforms of a precise time duration from an input providing a wide frequency range of signals and providing an output of that time duration. A slope polarity detecting switch of simple design lies at the heart of the circuit.

4 Claims, 2 Drawing Figures

SWITCHING CIRCUIT APPARATUS

BACKGROUND OF THE INVENTION

The present invention is related generally to electronics and specifically to a detector for detecting a specific frequency signal from an input comprising a broad frequency range of signals.

While there have been many types of tone detectors and switching circuits capable of detecting changes in slope polarity, all known circuits have lacked the simplicity and reliability of the present inventive concept.

There are instances such as in telephone communications where a single frequency tone burst is used on a line to perform certain signaling operations wherein the same line transmits a plurality of other frequencies comprising station-to-station communications. One such use is in the telephone system wherein the dial tones on a line are used to perform switching functions and then the same line is used to provide voice communications and wherein both of these types of signals must fall within a prescribed bandwidth of frequencies.

It is therefore an object of the present invention to provide an improved tone detector.

A further object of the invention is to provide an improved slope polarity change detector.

Other objects and advantages of the present invention may be ascertained from a reading of the specifications and claims in conjunction with the drawings wherein:

Figure 1:
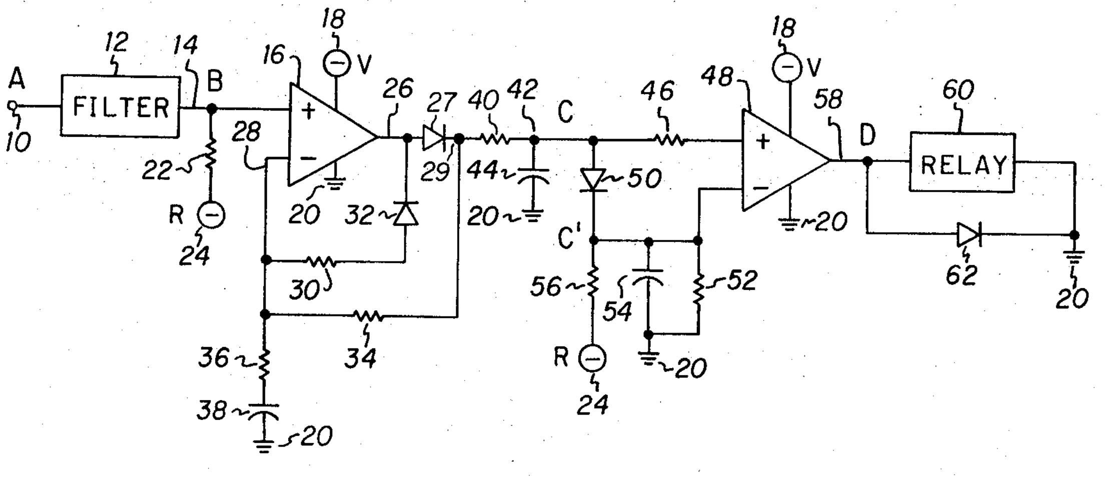
FIG. 1 is a schematic diagram of a preferred embodiment of the invention.

In FIG. 1 an input terminal 10 is utilized to supply signals to a filter 12. The signals appearing at terminal 10 will have various frequencies involved but the one of interest is a tone burst of a specific frequency which in one embodiment of the invention was 3,825 hertz. This tone burst is shown in FIG. *2a* and lasting or involving a time duration of T. An output of filter 12 is supplied on a line 14 to a positive input of a differential amplifier 16 having a negative voltage power terminal 18 or V and connected to ground 20. A resistor 22 is connected between line 14 and a negative potential terminal 24 which is labeled as R. The terminal 18 may be of a different direct current voltage in some embodiments of the invention than the reference voltage 24. While waveform 2B is shown as having a larger amplitude, this showing was for convenience and does not imply that it is necessary to signal amplify within filter 12. The amplifier 16 has an output lead labeled 26 and has a lead 28 applied to a negative input thereof. A resistor 30 is connected in series with a diode or unidirectional current means 32 between lead 28 and lead 26. A further resistor 34 is connected in series with a diode or unidirectional current means 27 between lead 28 and lead 26. A resistor 36 is connected in series with a capacitor 38 between lead 28 and ground 20. A resistor 40 is connected between a junction point 29 (between diode 27 and resistor 34) and a junction point 42. A capacitor 44 is connected between junction 42 and ground 20. A further resistor 46 is connected between junction 42 and a positive input of a differential amplifier 48. Amplifier 48 also has a power terminal connected to negative voltage source 18 or V and is also connected to ground 20. A diode or unidirectional current means 50 is connected between junction 42 and a negative input of amplifier 48. A resistor 52 and a capacitor 54 are connected in parallel between the negative input of amplifier 48 and ground 20. A further resistor 56 is connected between negative terminal 24 and the negative input of amplifier 48. The resistors 52 and 56 in combination with capacitor 54 provide an R-C time constant as will be explained later. An output lead 58 of amplifier 48 is connected to one end of a relay 60 which is connected at the other end to ground 20. A diode 62 is connected in parallel with relay 60 to reduce reverse voltage pulse amplitudes.

Figure 2:
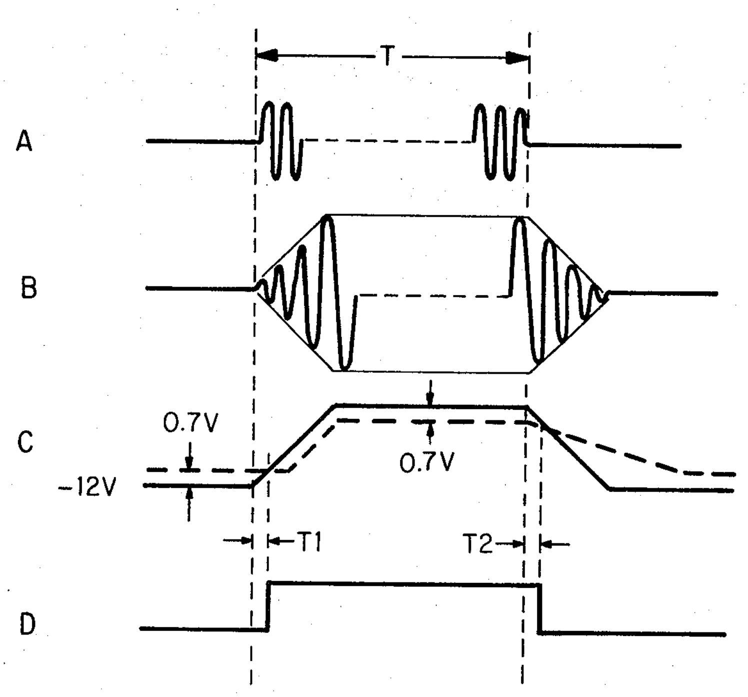
FIG. 2 is a plurality of waveforms graphically presenting the signals appearing at various points in FIG. 1.

Referring to FIG. 2 it will be noted that the waveforms are labeled A, B, C and D and that 2C comprises both a solid line and a dash line waveform. The dash line waveform may be given the designation of C'. Returning to FIG. 1, it will be noted that various points such as 10, 14, 42 and 58 have the letters A, B, C and D associated therewith. These are the points in the circuits that the waveforms may be found. The negative input to amplifier 48 is given the designation C' to indicate the voltage appearing thereat which is indicated by the dash line waveform of FIG. 2*c*.

The filter circuit shown in FIG. 1 passes the specific tone therethrough and the signal shown as FIG. 2*b* appears at lead 14. The slope is produced by the frequency and time delay characteristics of most filters including the filter 12. However, it will be noted that the waveform B has a positive slope during the first portion of time T which levels off to a zero slope until the end of time T then the slope turns negative. For the purposes of this application, the slope will be said to have changed polarity when the voltage of the waveform starts moving in a direction opposite the previous direction. In other words, the slope of waveform B does not change until the end of time T since a portion of the intermediate time was involved in zero amplitude or slope change.

The terms change of polarity of slope may also be used interchangeably with change of polarity of signal ramp or with voltage transition polarity.

The circuitry from lead 14 to and including the capacitor 44 comprises a half-wave voltage rectifier. Thus, the signal waveform appearing at junction point 42 is that as shown in solid lines in FIG. 2*c*. This solid line waveform is substantially a replica of the top portion of FIG. 2*b* less the 3,825 Hz. carrier signal.

In one embodiment of the invention, the resistor 56 was 42.2k ohms while resistor 52 was 651k ohms and the voltage at terminal 24 was 12 volts. With the input signal appearing at junction point 42 ranging from a negative 12 volts to near 0 volts, it can be ascertained that the point C' in FIG. 1 will range from −11.3 volts, due to the ratio of resistors 52 and 56, to a voltage which is −0.7 volts with respect to the voltage at point 42, due to the voltage drop through diode 50. Thus, the differential amplifier 48 will have its positive input at a lower relative polarity than its negative input when junction point 42 is at −12 volts. The opposite polarity will occur very soon after the input signal starts to rise toward ground or 0 volts.

The time T1 is a function of the charge time of resistor 40 and capacitor 44. C' does not change until after the diode 50 is forward biased. This, as shown in this circuit, is about the time the amplifier 48 switches due to the threshold established by resistors 52 and 56. When the slope changes to a negative slope the time constant established by C54, R52, and R56 causes C' to charge (discharge) more slowly toward the −11.3V level than C charges toward the −12V level. At the time C overtakes C′ the output of amplifier 48 again switches with a delay of T2. The difference in T1 and T2 is determined by the difference in rate of change of C and C′. T1 would approach T2 as the time constant established by C54, R52 and R54 approached ∞. The times T1 and T2 have been exaggerated for purposes of illustration in the present invention. The switching action provided in amplifier 48 produces the output as shown in FIG. 2d. The relay 60 was provided to illustrate a possible load to be used but the important feature is that the output voltage changes decisively and quickly and has a time duration substantially the same as the input signal shown as FIG. 2*a*. One embodiment of the invention provided an output which was within 1 millisecond of the time duration of the input tone burst. The time constant of the resistor 40 and capacitor 44 combination should be short compared to the envelope of the input signal so that the signal at point C in FIG. 1 follows the input signal envelope. Hence, T1 in most designs will be a function of the charge time of resistor 40 and capacitor 44, but these values should be picked with consideration for the input signal. The threshold voltage of 0.7 volts should be small with respect to the peak value of the input signal and thus T1 should be small.

In summary, the present invention detects a signal of time duration T in filter 12 and the waveform is distorted due to time delay characteristics in a filter. This modified waveform is then half-wave rectified and presented to a slope detecting amplifier comprising the components from 46 to 56. This amplifier detects a change in polarity of the slope of the input signal and switches its output in accordance therewith. While the time of occurrence of output waveform D does not coincide exactly with the time of occurrence of the input signal, its duration is the critical element and in actuality the time of occurrence is very nearly coincident with the input signal anyway.

While a single embodiment has been shown to illustrate the inventive concept, I do not wish to be limited to this embodiment but rather to the inventive concepts of the slope sensitive amplifier per se and using it to detect tone burst as claimed in the appended material.

I claim:

1. Switching circuit apparatus for switching at the commencement of both rising and falling input signal amplitude comprising, in combination:

differential amplifier means including first and second input means and output means;

signal input supplying means;

unidirectional means having first and second terminals for allowing current flow in only one direction therethrough;

means connecting said first terminal and said signal input supplying means to said first input means of said differential amplifier means;

ground means;

voltage reference means for supplying a voltage with respect to said ground means;

time delay means;

means connecting said second terminal directly to said voltage reference means, to said time delay means and to said second input means of said differential amplifier means, signal amplitude changes at said first input means being generally followed, but lagging, at said second input means for switching at the same prescribed lag after commencement of both rising and falling input signal amplitudes whereby switching signals appearing at said output means of said amplifier means occur when the relative polarity of signals appearing across said first and second input means changes.

2. Switching apparatus as claimed in claim 1 wherein said time delay means comprises resistance means and a capacitance means; and said unidirectional means comprises a diode.

3. Specific frequency tone burst detection apparatus comprising, in combination:

input means for supplying a plurality of signal frequencies including signal bursts of a specific tone to be detected;

filter means, connected to said input means, having a frequency characteristic designed for passing only signals on the specific tone to be detected;

rectifier means, connected to said filter means for receiving signals therefrom of the specific tone wherein the waveform thereof is modified in accordance with the delay characteristics of the filter means, said rectifier means providing as an output a voltage waveform representative of the envelope of the signal received from said filter means;

switching amplifier means, including input means and output means, the output means of said amplifier means switching in electrical signal amplitude upon a reversal in signal input slope amplitude by more than a predetermined amount; and means connecting said rectifier means to said input means of said amplifier means for supplying the rectified signal thereto.

4. Apparatus as claimed in claim 3 wherein the last named means comprises, in combination:

reference source means;

R-C time delay means connected to said reference source means;

diode means connected to said delay means and to said amplifier means; and said above named means providing first and second signals to said input means of said amplifier means whereby the amplitude change of said second signal lags the amplitude change of said first signal.

* * * * *